April 17, 1928.  1,666,067
R. BAILLIE ET AL
MACHINE FOR MAKING DRY CELL ELEMENTS
Filed Feb. 26, 1925  2 Sheets-Sheet 1

Inventors
R. Baillie
M. A. Adam
By Marks Clerk
Attys

April 17, 1928.  1,666,067

R. BAILLIE ET AL

MACHINE FOR MAKING DRY CELL ELEMENTS

Filed Feb. 26, 1925   2 Sheets-Sheet 2

Inventors
R. Baillie
M A Adam
By Marks Clerk
Attys.

Patented Apr. 17, 1928.

1,666,067

UNITED STATES PATENT OFFICE.

ROBERT BAILLIE AND MATTHEW ATKINSON ADAM, OF LONDON, ENGLAND; SAID BAILLIE ASSIGNOR TO SAID ADAM.

MACHINE FOR MAKING DRY-CELL ELEMENTS.

Application filed February 26, 1925, Serial No. 11,848, and in Great Britain March 3, 1924.

This invention relates to the manufacture of Leclanché and the like electric cells of the so-called dry type, in which a depolarizer mass rendered solid by pressure is employed.
Cells of this type are usually made by the employment of a mould which is more or less filled with the depolarizer mixture and moulding pressure is applied to this mixture by one or more plungers or rams. The desirable depolarizer mixtures are not fluid and do not transmit pressure as a fluid, hence the pressure distribution axially is not uniform in practice. For this reason and to minimize the pressure variation, it is customary in the best practice to apply the pressure by rams from both ends of the mould or to employ several strokes of each ram with intermediate filling with further mixture. Also the reciprocating motion of rams imposes intermittent feed of the mixture and this with the fact that the pressure must not be applied too rapidly involves rather slow working so that production can only be increased by employing multiple rams working to compress into a group of moulds.

Now the present invention has for its objects to secure a depolarizer mass of any desired uniform density and to facilitate and cheapen the production of such cells.

It has been found by experiment that the semi-solid depolarizer mixtures used for such cells are susceptible of packing to any desired density by the aid of a feed screw delivering into a mould chamber and that a uniform density can thus be obtained in the solid mass.

The invention consists in the method and means for rapidly producing electric cells having a depolarizer mass comprising a rotating screw feeding device receiving a semi-solid depolarizer mixture, and delivering same into a mould chamber under pressure preferably upon a suitable carbon stem or like electrode.

The invention also consists in the method and means for producing electric cells as above described comprising also a movable mould block with a plurality of mould chambers intermittently brought into register with the delivery end of the feeding device.

The invention also consists in the above described method and means for producing electric cells comprising also an electrode feeding-in device for carbon stems, preferably with removable distance pieces or rings adapted to protect the terminals already applied to the electrodes, and means for feeding out the completed "dolly" as the moulded depolarizer is usually called.

The invention also consists in the machines and devices hereinafter described.

The accompanying drawings illustrate one way of carrying the invention into effect by way of example, as applied to the manufacture of dry cells of the type having a zinc container with depolarizer mixture of graphite and manganese dioxide powder made semi-plastic with fluid, and compressed into a solid mass around a centrally placed carbon electrode.

In the drawings:—

Figure 1:
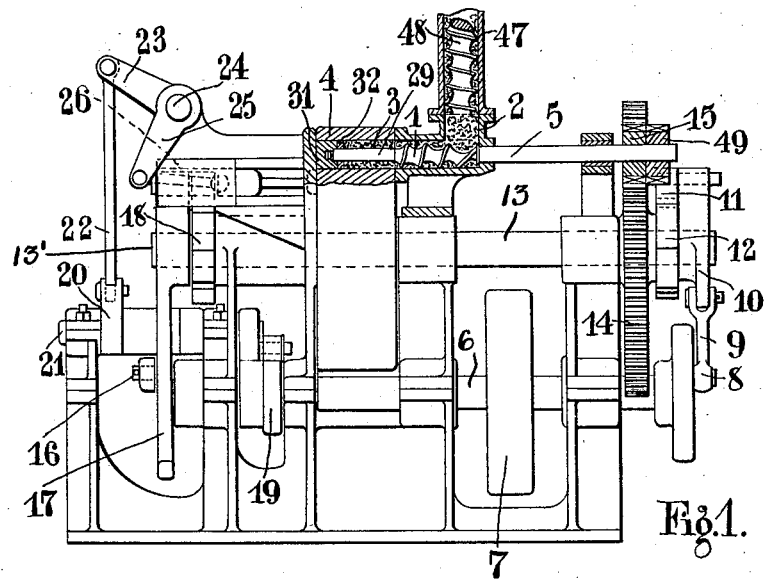
Figure 1 shows a front view partly sectioned of a machine for forming the "dollies";
Figure 4:
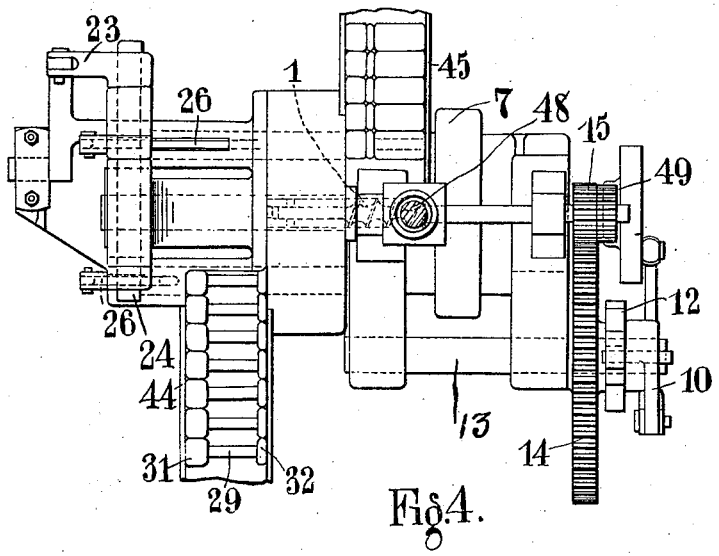
Figure 4 is a plan view of Figure 1.
Figure 2:
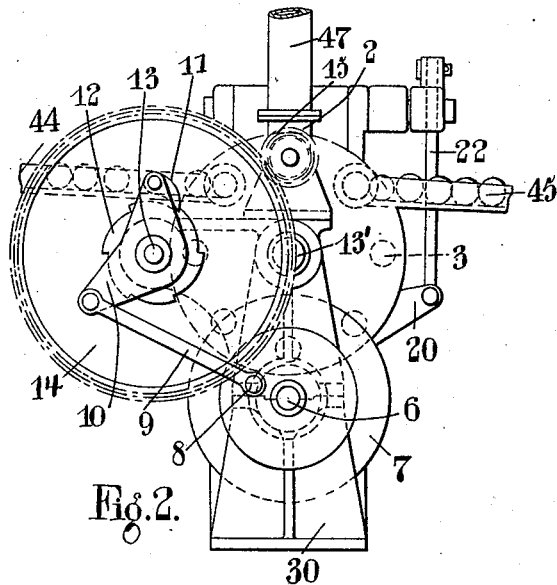
Figures 2 and 3 are end views of Figure 1 from opposite ends.
Figure 3:
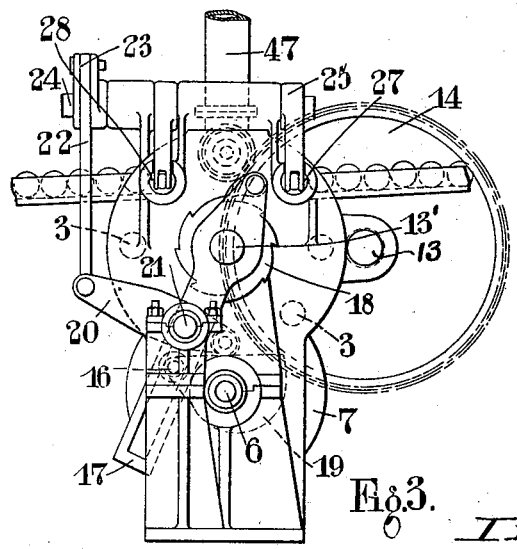

Referring to the drawings, a machine is shown furnished with a suitable horizontal rotating screw 1, preferably regulated end on with spiral spring release attachment, not shown, and a casing 2 for receiving the depolarizer mixture and compressing the same at a predetermined pressure into horizontal mould recesses 3 contained within an adjacent circular mould block 4 rotating intermittently on a horizontal axis and brought into register with the delivery end of the horizontal screw feeder 1, the driving shaft 5 of which is at the opposite end and driven with a circular motion by a main horizontal shaft 6 supported within the main machine framing 30 with suitable bearings and mechanically driven by the pulley 7.

A vertical feed screw mechanism consisting of a case 47 and a screw 48 driven by a suitable gear from a pinion 49 on the shaft 5 may be used to supply the horizontal feed screw 1.

An intermittent feed is secured by means of the crank pin 8, link 9, rocking lever 10, ratchet 11, ratchet wheel 12 on shaft 13 and a pair of gear wheels 14 and 15, of which 14 is connected rigidly to the ratchet wheel 12.

This main horizontal shaft 6 also simultaneously at its opposite end drives a crank pin 16, slotted lever 17 and pawl and ratchet wheel gear 18 on the suitably supported rotary shaft 13', upon which the circular rotary mould block 4 is rigidly mounted.

The lower main driving shaft 6 which, as above described, actuates the depolarizer mixture feeder 1 and the rotary cylindrical mould block 4 is also connected by cam 19, rocking lever 20 on shaft 21 and upright link rod 22 and lever 23 to another upper transverse shaft 24, by means of which, through levers 25 and links 26, the required reciprocating movements and actions are given to two separate parallel and horizontal guided circular rams or pushers 27, 28; one (27) for receiving at the proper time from the guide runner 44, mounted carbon stem electrodes 29, and placing same endwise into the rotary mould block 4; the other pusher (28) at the same time, in the mould recess two holes removed, feeding out the formed dolly, revolved over to this position from the forming position at the depolarizer feeder delivery, along the guide runner 45. These pushers function as injectors and ejectors while the depolarizer feed screw is acting and are moved clear before the rotary mould block 4 turns.

The cam gear motion 19, 20, 21, 22 is such that injection and ejection take place when the rotary block is not in motion, and the rotary mould block is arranged to be still when an incoming uncovered carbon stem is entering the same, and the formed dolly is leaving.

By means of the intermittently driving slotted lever ratchet gear 17, 18, the circular mould block is also arranged to move quickly into the feeding position, thus giving a longer pause in the block's movement while the feeding, charging and discharging of the mounted carbon stems and dollies are taking place simultaneously.

The mounting of the carbon stem electrodes 29 for concentrically placing and temporarily holding the same inside the mould recesses in the rotating mould block is effected by placing a wood or rubber distance piece ring or washer disc 31, 32 of suitable thickness at each end of the stem, the terminal end of which is thus protected and supported during the operation by the disc 31. At the same time the other portable disc or washer 32 is acting as a centering support to the plain end of the carbon stem, and is capable of moving towards the other washer as the polarizer mixture is being fed into the mould. The space occupied by these distance piece carbon stem holders after their removal represents the required exposure or projection of the carbon stem from the terminal end of the formed dolly.

These distance pieces or washers being circular, facilitate inclined plane rolling to and from the pushers before entering and after leaving the machine and, before their removal after the forming of the dolly, are useful as holders when carrying out subsequent steps in the operation of dry cell forming.

Having now described our invention what we claim as new and desire to secure by Letters Patent is:—

In a machine for forming electric cells having a depolarizer mass, a mould, means for feeding said depolarizer mass into said mould, means for inserting a carbon electrode in said mould and means carried by said electrode for spacing said electrode from the walls of the mould, said spacing means comprising a washer at each end of the electrode, one of said washers being slidably mounted on the electrode.

In testimony whereof we have signed our names to this specification.

ROBERT BAILLIE.
MATTHEW ATKINSON ADAM.